UNITED STATES PATENT OFFICE.

EMIL NAUMANN, OF COLOGNE, GERMANY.

PROCESS OF PRODUCING NITRATE OF AMMONIUM.

SPECIFICATION forming part of Letters Patent No. 764,251, dated July 5, 1904.

Application filed March 3, 1904. Serial No. 196,314. (No specimens.)

*To all whom it may concern:*

Be it known that I, EMIL NAUMANN, a subject of the Emperor of Germany, and a resident of Cologne, Province of the Rhine, Kingdom of Prussia, Germany, have invented certain new and useful Improvements in Processes of Producing Nitrate of Ammonium, of which the following is a specification.

This invention has reference to a novel process of producing nitrate of ammonium from nitrate of sodium and sulfate of ammonium.

The well-known process of producing nitrate of potassium from nitrate of sodium and chlorid of potassium by concentrating suitably-composed aqueous solutions cannot be used for the commercial production of nitrate of ammonium. Suitably-composed aqueous solutions of nitrate of sodium and sulfate of ammonium will not upon concentration precipitate sufficiently large quantities of sodium sulfate, so that upon cooling of the mother-lye essentially or only nitrate of ammonium will separate. The components of the salts remaining in the hot mother-lye (symbolized by Na,NH$_4$,SO$_4$NO$_3$) form large quantities of a double salt of sulfate of ammonium, so that the dissolving power of the water present is exhausted thereby. Then begins the precipitation of nitrate of ammonium simultaneously with the continued separation of the above-mentioned double salt as the solubility of the latter further decreases in accordance with the falling temperature. The average proportion of sulfate in the total precipitations thus effected is practically very large. If, however, the mother-lyes of such concentrations are at first allowed to cool only to the limit of the temperature at which the dissolving capacity of the water present is exhausted for nitrate of ammonium too, then the double salt of sulfate of ammonium alone will at first precipitate. Upon separating the new mother-lye from those precipitations and allowing said lye to cool in the usual manner then precipitations are obtained which contain less sulfate. The relative proportion of sulfate in this last precipitation, however, is still too large for refining the nitrate of ammonium therein in a remunerative manner. Accordingly the practical conversion of

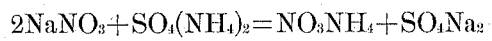

in an aqueous solution appears to be impossible, owing to the laws of solubility of the salts in question when contained in one solution.

The maximum solubility for each single component of the solutions obtained, as above described and having the desired composition, does not necessitate the sole separation of nitrate of ammonium. When cooling these solutions below the limit of saturation for the double salt of the sulfate—that is, below 0° centigrade—then the solubility of the double salt also decreases in accordance with the lowering of the temperature. However, relatively large quantities of nitrate of ammonium were successfully precipitated and commercially isolated notwithstanding the normal relations of the solubility of the salts. Hereby the nitrate of ammonium is separated, first leaving the sulfate in the supersaturated mother-lyes. If, however, as above described, nitrate of ammonium and the double salt of sulfate of ammonium are precipitated from the hot mother-lye of a certain concentration by cooling the lye to the limit of its saturation, then the final temperature for cooling the new mother-lye is a critical one, in so far as the water present at this temperature is just sufficient to keep in solution all the nitrate of ammonium and the sulfate, which is still dissolved. Consequently upon further cooling precipitations of both salts must result according to the normal laws of solubility.

When the mother-lye and the precipitations obtained by cooling down to the critical temperature are separated, then the further cooling of the lye is not carried out according to the former method in which the differences of solubility at various temperatures are utilized for the precipitation of salts, this former method consisting in producing solutions which were saturated at a high temperature and allowing same to cool off gradually and voluntarily in large uncovered crystalizing vessels, or, if desired, these solutions were artificially cooled and stirred to accelerate the precipitation of salts. On the contrary, the mother-lye separated at the critical temperature is put into suitable covered cooling vessels which have cooling-surfaces arranged at relatively short equal distances. Herein the lye is subjected to a compulsorily accelerated but otherwise undisturbed cooling, whereby precipitations are obtained which practically consist of nitrate of ammonium alone. The remaining mother-lyes represent solutions supersaturated with ammonium-sodium sulfate and after being drawn off drop same. The precipitate of nitrate of ammonium is now mechanically freed from the mother-lye adhering thereto and forms then a raw salt containing a very high percentage of nitrate of ammonium. The percentage of sulfate therein is small enough for allowing to refine the nitrate of ammonium to any degree according to simple methods, yielding then very large quantities of refined products.

A close examination of the described phenomena—viz., the previous precipitation of nitrate of ammonium and the supersaturation of the remaining lye by ammonium-sodium sulfate for the purpose of obtaining commercial results—led to the following conclusions:

The various solutions obtained during the operation of the process, according to the manner of working and the stage of same, will differ particularly in the proportions in which the single components of the raw materials are contained therein, as symbolically expressed by $Na, NH_4, SO_4, NO_3$. This is the case even if the various portions of water are not considered.

For the purpose of uniformly denominating the total composition of the various solutions I will assume that all ammonium is contained therein in the form of nitrate of ammonium and all the sulfuric acid as sulfate of sodium, while the remaining components $Na, NO_3$ are supposed to be therein in form of nitrate of sodium. If, further, the cooling temperatures below $-5°$ centigrade for practical reasons are not considered, then for a commercial application of the above-described method of a previous precipitation of nitrate of ammonium solutions are required which contain for the components of one hundred parts of sulfate of sodium the components of more than three hundred parts of nitrate of ammonium. Each one hundred parts of water therein require the components of more than one hundred parts of nitrate of ammonium. In addition there may be present any desirable quantity of nitrate of sodium which may rise to the point of saturation of the water present. The nitrate of sodium contained in the solutions with the nitrate of ammonium and the sulfate of sodium does not reduce the capability of the sulfate to remain dissolved in the supersaturated solution. On the contrary, its presence seems to increase it.

For the practical application of separating solely nitrate of ammonium by means of its previous precipitation particularly such solutions are to be considered in which the phenomenon of the supersaturation is brought into play in great stability and which per cooling charge yield a large output without resorting to such low temperatures as to cause disproportionately great trouble and expense. Such particularly-adapted solutions contain in one hundred parts of water considerably more than the components of one hundred parts of nitrate of ammonium and for the components of one hundred parts of sulfate of sodium considerably more than the components of three hundred parts of nitrate of ammonium, besides great quantities of nitrate of sodium. With reference to the last-named salt it is advisable to arrange matters so that the dissolving power of the water present is not yet exhausted in the solutions when same have been cooled to the intended final temperature for nitrate of sodium. Consequently the precipitated nitrate of ammonium will not contain any precipitated nitrate of sodium.

A suitable proportion of salts in such solutions in accordance with the above-mentioned conditions is from thirty to fifty parts of nitrate of sodium to one hundred parts of water. The larger part of the nitrate of sodium contained in the solutions under the above conditions is, indeed, obtained upon the cooling of the hot mother-lyes when, as above mentioned, sulfate of ammonium and nitrate of sodium are boiled in aqueous solution, provided equivalent quantities of both solutions were employed in the charge. This is a consequence of the precipitation of corresponding quantities of ammonium-sodium sulfate. The process under these conditions, as above described, finds expression in the following equation: The hot mother-lye of an inspissation having a charge of

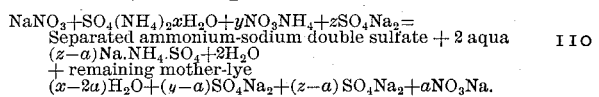

$NaNO_3 + SO_4(NH_4)_2 xH_2O + yNO_3NH_4 + zSO_4Na_2 =$
Separated ammonium-sodium double sulfate + 2 aqua
$(z-a)Na.NH_4.SO_4 + 2H_2O$
+ remaining mother-lye
$(x-2a)H_2O + (y-a)SO_4Na_2 + (z-a)SO_4Na_2 + aNO_3Na.$ The eventually desirable plus of nitrate of sodium which is to coöperate finally in the solutions employed to separate the isolated nitrate of ammonium may be added to the charges at the beginning of the process, or it may be added to the solutions during the latter stages of same.

In practically carrying out my invention of alternately decomposing nitrate of sodium and sulfate of ammonium I substantially proceed as follows:

A. A mixed solution of nitrate of sodium and sulfate of ammonium is boiled down for the purpose of precipitating sulfate of sodium. An equivalent charge of the salts or one with an excess of nitrate of sodium is advantageously employed, and the boiling is continued only as long as is necessary for obtaining coarse-grained precipitations. Hereby mother-lyes are easily obtained which contain in one hundred parts of water the components of about one hundred and eighty to two hundred parts of nitrate of ammonium and from sixty to seventy parts of sulfate of sodium, besides probable quantities of nitrate of sodium. The hot mother-lye is separated from the precipitated sulfate of sodium according to well-known methods.

B. The mother-lye thus resulting is now cooled down to about its saturation limit for nitrate of ammonium. This is done for the purpose of precipitating the double salt of ammonium-sodium sulfate and for obtaining a new mother-lye containing relatively small amounts of the said sulfate. The new mother-lye is then separated from the precipitations and further concentrated to increase its proportion of nitrate of ammonium. If the conditions described under A are well observed during the process of boiling down the solutions, then the saturation limit for nitrate of ammonium is easily ascertained. In each instance it will be found to be between 15° and 20° centigrade. To facilitate the quick working of the method, the hot mother-lye may be brought down to the desired temperature by artificially cooling and stirring the mass. The cooling and stirring, however, must be so regulated that coarse-grained ammonium-sulfate double salt is obtained, because this may be easily filtered. The new mother-lyes obtained according to the foregoing method contain in one hundred parts of water the components of about one hundred and sixty to one hundred and eighty parts of nitrate of ammonium and twenty-four to twenty-six parts of sulfate of sodium, besides considerable quantities of nitrate of sodium. The mother-lyes are then separated from the precipitations according to well-known methods and, if desired, further concentrated by evaporation for the purpose of obtaining large outputs, when the lyes undergo further treatment, as described in section C, without being forced to cool down below 0° centigrade. For commercial purposes it is sufficient in each case to reduce the solutions by concentration to such a point that one hundred parts of water contain two hundred and twenty to two hundred and fifty parts of nitrate of ammonium.

C. The solutions obtained according to the method described in section B are subjected to compulsorily-accelerated cooling, but otherwise left undisturbed, when the nitrate of ammonium is obtained in solid form. To insure the sole precipitation of nitrate of ammonium from the last-mentioned lyes, it is essential that during their treatment no solid ammonium-sodium sulfate comes in contact therewith. It is further essential to guard the lyes from outside disturbances which may be caused by strong surface evaporations or mechanical stirring. For each of the lyes obtained according to the method described in section B there is a critical temperature at which the normal solubility of the water present is exhausted for the salts dissolved therein. Further investigations have shown that it is essential for the precipitation of nitrate of ammonium alone to cool the lyes quickly from a temperature above the critical point to a temperature of from 10° to 15° centigrade below same. For solutions obtained according to the methods described in sections A and B the critical temperature is approximately below 35° and above 15° centigrade, according to the concentration of the solutions. If the solutions contain the components for about two hundred to two hundred and fifty parts of nitrate of ammonium in one hundred parts of water, then satisfactory results are obtained in each case by placing the solutions at 35° to 40° centigrade in suitable cooling vessels and allowing the cooling medium at about 10° centigrade to act on the cooling-surfaces. When the cooling-surfaces are arranged in a practical manner at short equal distances of, say, from fifty to one hundred millimeters, then the solutions under treatment will in ten to twenty minutes have been cooled down so far below the critical temperature that relatively large quantities of nitrate of ammonium have separated. The mother-lye supersaturated with sulfate in contact with the precipitations appears to have acquired a greater capability of keeping the sulfate in solution. In accordance with this the lye may be cooled further down to the intended final temperature in a convenient manner and may remain in contact with the precipitations. However, it is not advisable to let this contact last for more than two or three hours, as then some sulfate is likely to be precipitated too. To what degree the cooling may be carried on depends solely on whether the increase in the output of nitrate of ammonium obtained by such cooling to a lower temperature still pays for the trouble and expense caused thereby.

D. The mother-lye is now drawn off from the precipitations obtained in section C. The precipitate is further freed from lye according to well-known methods. The remaining nitrate of ammonium has a high percentage of pure product and may be further refined to any degree desired for obtaining products of the highest purity.

E. The ammonium-sodium sulfate obtained during the operation of the process is used in the next mixtures, worked up according to section A, in place of the quantity of sulfate of ammonium contained therein.

F. The mother-lyes resulting in section D are strengthened by the addition of sulfate of ammonium and, if necessary, concentrated, so that they possess a similar composition as the mother-lyes resulting in section A. They are worked up with those lyes according to the methods described in sections A, B, &c.

Having thus described my invention, I claim as new and desire to secure by Letters Patent—

1. The process of producing nitrate of ammonium from nitrate of sodium and sulfate of ammonium consisting in preparing a mixed aqueous solution of these salts and boiling down said solution, precipitating thereby sulfate of sodium, separating the hot mother-lye from the precipitate and cooling same down to about the limit of its saturation for nitrate of ammonium whereby the double salt of ammonium-sodium sulfate is precipitated, separating now the new mother-lye from the double-salt precipitation and subjecting said new lye to a compulsorily-accelerated but otherwise undisturbed cooling whereby practically nitrate of ammonium alone is precipitated, and separating same from the lye.

2. The process of producing nitrate of ammonium as such or in form of ammonium-sodium sulfate from nitrate of sodium and sulfate of ammonium consisting in preparing a mixed aqueous solution of these salts and boiling down said solution, precipitating thereby sulfate of sodium, separating the hot mother-lye from the precipitate and cooling same down to about the limit of its saturation for nitrate of ammonium whereby the double salt of ammonium-sodium sulfate is precipitated, separating now the new mother-lye from the double-salt precipitation and subjecting said new lye to a compulsorily - accelerated but otherwise undisturbed cooling whereby practically nitrate of ammonium alone is precipitated, and separating same from the lye and refining it to any desired degree.

3. The process of producing precipitations consisting essentially of nitrate of ammonium alone by preparing solutions which contain for the components of one hundred parts of sulfate of sodium the components of more than three hundred parts of nitrate of ammonium and per one hundred parts of water the components of more than one hundred parts of nitrate of ammonium besides any desirable quantity of nitrate of sodium, subjecting said solutions to an artificial, compulsorily-accelerated but otherwise undisturbed cooling down to temperatures at which the normal power of solubility of the water present is exhausted for the nitrate of ammonium and the ammonium-sodium sulfate dissolved therein.

Signed at Cologne this 3d day of February, 1904.

EMIL NAUMANN.

Witnesses:
   WILHELM RUEPPERS,
   GUSTAV ELSUR.